United States Patent
Suzuki

(10) Patent No.: US 7,578,897 B2
(45) Date of Patent: Aug. 25, 2009

(54) RUBBER MEMBER STICKING DEVICE

(75) Inventor: Shoju Suzuki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 386 days.

(21) Appl. No.: 10/505,866

(22) PCT Filed: Feb. 28, 2003

(86) PCT No.: PCT/JP03/02295

§ 371 (c)(1),
(2), (4) Date: Mar. 10, 2005

(87) PCT Pub. No.: WO03/072475

PCT Pub. Date: Apr. 9, 2003

(65) Prior Publication Data

US 2005/0158420 A1    Jul. 21, 2005

(30) Foreign Application Priority Data

Feb. 28, 2002    (JP) .................... 2002-053961

(51) Int. Cl.
*B29C 35/00* (2006.01)
(52) U.S. Cl. ............ 156/110.1; 156/111; 156/414; 156/415; 156/416; 156/417; 156/418; 156/419; 156/420; 428/139; 425/DIG. 14; 425/38; 269/14; 269/13; 492/21
(58) Field of Classification Search ........... 428/139; 425/DIG. 14, 38; 269/13, 14; 492/21; 156/414, 156/415, 416, 417, 418, 419, 420, 110.1, 156/111
See application file for complete search history.

(56) References Cited

U.S. PATENT DOCUMENTS

| 3,948,717 | A | * | 4/1976 | Suzuki et al. ............ 156/415 |
| 4,010,059 | A | * | 3/1977 | Yabe .................... 156/420 |
| 4,288,265 | A | * | 9/1981 | Pacciarini et al. ........ 156/126 |
| 4,923,554 | A | * | 5/1990 | Ozawa ................... 156/417 |
| 5,203,947 | A | * | 4/1993 | Boeker .................. 156/417 |
| 5,635,016 | A | * | 6/1997 | Byerley ................. 156/406.2 |

(Continued)

FOREIGN PATENT DOCUMENTS

EP    0 482 830 A2    4/1992

(Continued)

*Primary Examiner*—William P Watkins, III
(74) *Attorney, Agent, or Firm*—Sughrue Mion, PLLC

(57) ABSTRACT

Provided is a rubber member sticking device which prevents a sheet material held from becoming deformed and stretching during a separation operation, thus suppressing loss of energy and eliminating traces of vacuum holes. When an unvulcanized rubber sheet 12 is stuck, the unvulcanized rubber sheet 12 is supported by a separating surface 14A of a flat plate 14 and fitting surfaces 19A of a lifting member 16 without a difference in level being created therebetween. In this state, the unvulcanized rubber sheet 12 is in close contact with the fitting surfaces 19A of the lifting member 16. When the unvulcanized rubber sheet 12 is separated, a hydraulic jack 20 lowers the lifting member 16 to create a difference in level between the separating surface 14A of the flat plate 14 and the fitting surfaces 19A of the lifting member 16 so that the unvulcanized rubber sheet 12 is supported only by the separating surface 14A of the flat plate 14. Thus, the unvulcanized rubber sheet 12 can be easily separated, and deformation and stretching of the unvulcanized rubber sheet 12 during a separation operation can thereby be suppressed.

3 Claims, 13 Drawing Sheets

U.S. PATENT DOCUMENTS 5,923,408 A * 7/1999 Takabayashi ............... 355/53
2002/0043750 A1 * 4/2002 Lenz ........................... 269/13

FOREIGN PATENT DOCUMENTS

| JP | 2001-009928 A | 1/2001 |
| JP | 2001-301058 A | 10/2001 |
| JP | 2001-315219 A | 10/2001 |
| JP | 2001-301058 A | 11/2001 |
| JP | 2001-315219 A | 11/2001 |

* cited by examiner

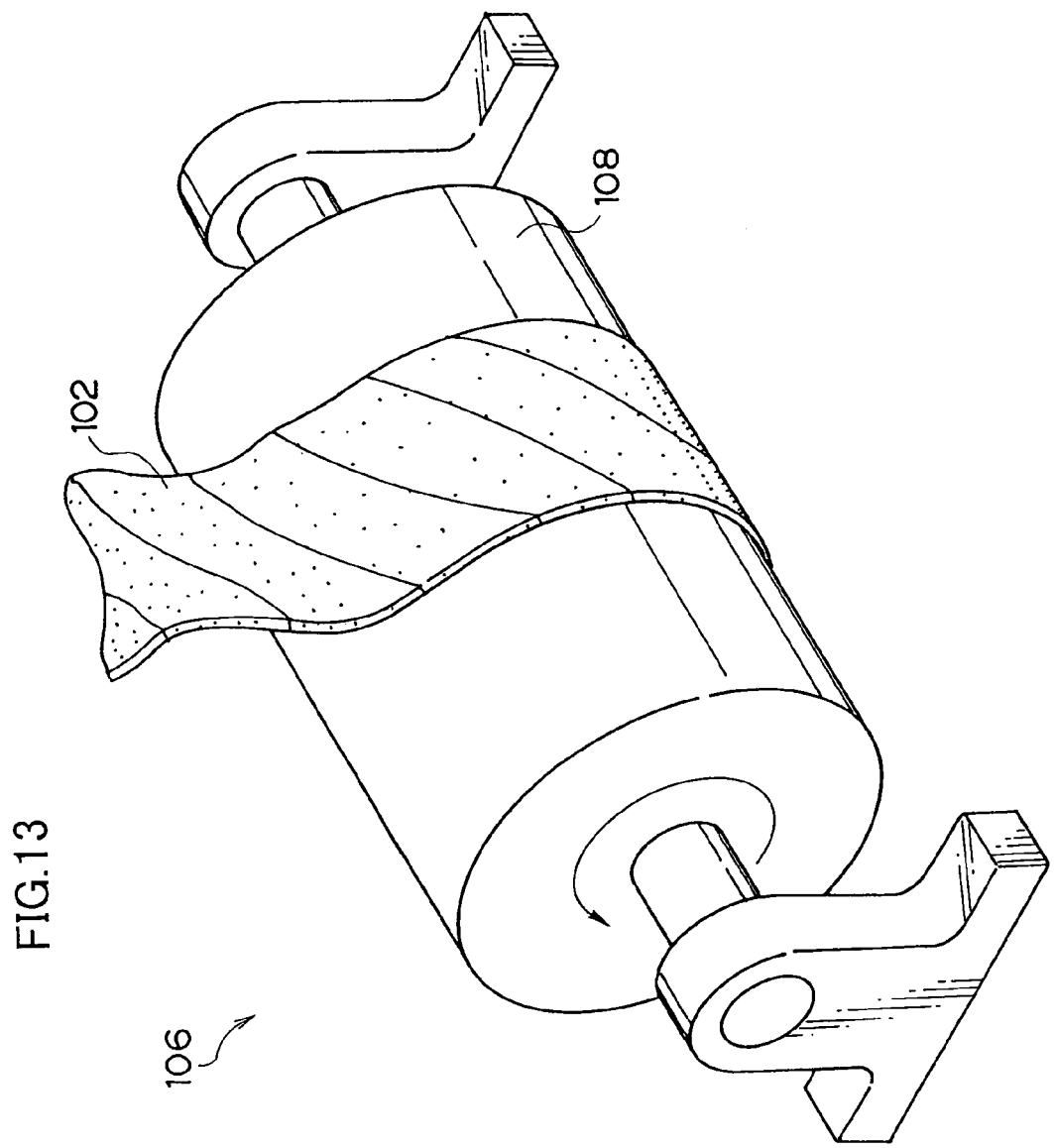

RUBBER MEMBER STICKING DEVICE

TECHNICAL FIELD

The present invention relates to a rubber member sticking device.

BACKGROUND ART

As shown in FIGS. 10 to 13, a rubber member sticking device 100/106, in which a flat plate 104/cylindrical body 108 handles a viscous sheet material 102, is used as a device for holding and transferring a viscous sheet material such as an unvulcanized rubber sheet.

A method is known wherein, when a viscous sheet material 102 is held by a rubber member sticking device 100/106, the viscous sheet material 102 is stuck on a flat plate 104/cylindrical body 108 which has a good adhesion compatibility with the viscous sheet material 102, and then, when the viscous sheet material 102 is transferred, force is applied thereon so that the viscous sheet material 102 is separated from the flat plate 104/cylindrical body 108. However, in this method, as shown in FIGS. 11 and 13, depending on the extensibility of the viscous sheet material 102, the viscous sheet material 102 may become deformed and stretch by virtue of a separation force.

Thus, a method has been adopted, wherein the viscous sheet material 102 is held by means of the suction of a vacuum device, and the viscous sheet material 102 is then separated by means of a vacuum break or an air blow. However, when this method is used, loss of energy is substantial and traces of vacuum holes of the vacuum device are left behind. In a case where the air blow method is utilized, air is blown between the flat plate 104/cylindrical body 108 and the viscous sheet material 102 to separate them from each other, and there is thus also a possibility of the viscous sheet material 102 becoming deformed.

The present invention has been made in view of the above facts, and provides a rubber member sticking device which prevents the viscous sheet material from becoming deformed and stretching during the separation operation, suppresses loss of energy and eliminates traces of vacuum holes.

DISCLOSURE OF THE INVENTION

A rubber member sticking device according to claim 1 of the present invention comprises: a first sheet receiving member including a separating surface capable of releasing from a sheet material; a second sheet receiving member including fitting surfaces capable of adhering to the sheet material; and a driving means driving the first sheet receiving member or the second sheet receiving member, such that, when the sheet material is stuck, the sheet material is supported by the separating surface and the fitting surfaces without a difference in level being created therebetween, and, when the sheet material is separated, the sheet material is supported only by the separating surface with a difference in level being created between the separating surface and the fitting surfaces; wherein the sheet material is a thin material and includes, for example, a viscous sheet material such as an unvulcanized rubber sheet material for tires.

In the rubber member sticking device according to claim 1 of the present invention, when the sheet material is stuck, the sheet material is supported by the separating surface of the first sheet receiving member and the fitting surfaces of the second sheet receiving member without a difference in level being created therebetween. In this state, the sheet material is in close contact with the fitting surfaces of the second sheet receiving member.

Accordingly, even when the rubber member sticking device is moved in a vertical, longitudinal or widthwise direction, or rotated, the sheet material is neither removed nor dislocated.

On the other hand, when the sheet material is separated, the driving means drives the first sheet receiving member or the second sheet receiving member to create a difference in level between the separating surface of the first sheet receiving member and the fitting surfaces of the second sheet receiving member so that the sheet material is supported only by the separating surface of the first sheet receiving member.

In this process, only portions of the sheet material supported by the fitting surfaces are released first in a state in which the remaining portions of the sheet material continue to be supported by the separating surface. Therefore, deformation and stretching of the sheet material occur only at portions thereof corresponding to the fitting surfaces, and in this way wholesale deformation and stretching of the sheet material can be suppressed. Then, when the sheet material is separated from the separating surface, because the separating surface has no adhesive property, the sheet material can be transferred and transported with a modicum of force. Further, unlike the prior art, it is not necessary for the sheet material to be held by means of suction of a vacuum device, and traces of vacuum holes of the vacuum device can thus be eliminated.

As described above, the rubber member sticking device according to the present invention produces a superior effect insofar that the sheet material is prevented from becoming deformed and stretching during the separation operation, loss of energy is suppressed and traces of vacuum holes are eliminated.

In the rubber member sticking device according to claim 2 of the present invention, which is based on the structure according to claim 1, a surface constituted of the separating surface and the fitting surfaces, for supporting the sheet material, is a flat surface.

In the rubber member sticking device according to claim 2 of the present invention, the sheet material is supported by the flat surface.

In this state, since the gravity of the sheet material acts directly on the supporting surface, the sheet material can be held even when the adhesive force on the fitting surfaces of the second sheet receiving member is relatively weak. When only a modest adhesive force is required for settling the sheet material on the fitting surfaces, only a modest driving force is required for separating the sheet material from the fitting surfaces, and in consequence the sheet material can be held and transferred with a modicum of energy.

In the rubber member sticking device according to claim 3 of the present invention, which is based on the structure according to claim 1, a surface constituted of the separating surface and the fitting surfaces, for supporting the sheet material, is a cylindrical surface.

In the rubber member sticking device according to claim 3 of the present invention, the sheet material is supported by the cylindrical surface.

The sheet material supported by the cylindrical surface is capable of rotating movement. A combination of the rotating movement and the separation operation enables the sheet material to be transferred easily.

In the rubber member sticking device according to claim 4 of the present invention, which is based on the structure according to claim 3, the sheet material is supported by a cylindrical body serving as a transfer drum for tires.

In the rubber member sticking device according to claim 4 of the present invention, since the sheet material is supported by the cylindrical body serving as a transfer drum for tires, the sheet material can be transferred easily. An unvulcanized rubber sheet material for tires is preferably used as the sheet material.

In the rubber member sticking device according to claim 5 of the present invention, which is based on the structure according to any of claims 1 to 4, the separating surface of the first sheet receiving member is provided with a plurality of through-holes extending in a thickness direction of the first sheet receiving member, and the second sheet receiving member is provided so as to fit into/retract from the through-holes, so that the sheet material is supported by the fitting surfaces and the separating surface without a difference in level being created therebetween.

In the rubber member sticking device according to claim 5 of the present invention, the sheet material is supported by the separating surface of the first sheet receiving member and the fitting surfaces of the second sheet receiving member without a difference in level being created therebetween. In other words, when the sheet material is stuck, the second sheet receiving member is pushed outside through the through-holes of the first sheet receiving member so as not to create a difference in level between the fitting surfaces of the second sheet receiving member and the separating surface of the first sheet receiving member.

On the other hand, when the sheet material is separated, the second sheet receiving member is pulled inside through the through-holes of the first sheet receiving member, and the sheet material is supported only by the separating surface of the first sheet receiving member.

This relatively simple structure, in which the second sheet receiving member is provided so as to fit into/retract from the through-holes of the first sheet receiving member, provides the rubber member sticking device with plural surfaces to be fitted to the sheet material.

The plural fitting surfaces, where the sheet material and the second sheet receiving member make contact with each other, enable the sheet material to be held in a stable fashion. Further, since the force required to hold the sheet material is dispersed and thus only a relatively small force is applied to each of the fitting surfaces, only a relatively small force needs to be applied to each of the portions of the sheet material corresponding to the fitting surfaces during the separation operation. Accordingly, deformation and stretching of the sheet material during the separation operation can be prevented with greater certitude.

In the rubber member sticking device according to claim 6 of the present invention, which is based on the structure according to any of claims 1 to 5, on a surface constituted of the separating surface and the fitting surfaces for supporting the sheet material, the fitting surfaces are respectively formed in a substantially V-shape in a plan view.

In the rubber member sticking device according to claim 6 of the present invention, the sheet material makes contact with the substantially V-shaped fitting surfaces on the supporting surface.

Since the fitting surfaces are respectively formed in a substantially V-shape and thus the fitting surfaces make close contact with the sheet material at a certain angle to the widthwise direction of the sheet material, the sheet material is easily separated from the fitting surfaces.

In the rubber member sticking device according to claim 7 of the present invention, which is based on the structure according to any of claims 1 to 4, the second sheet receiving member is provided at both end portions of the first sheet receiving member such that, when the sheet material is stuck, both end portions of the sheet material make contact with the fitting surfaces.

In the rubber member sticking device according to claim 7 of the present invention, both end portions of the sheet material make contact with the fitting surfaces of the second sheet receiving member.

The simple structure, in which both end portions of the sheet material make contact with the fitting surfaces of the second sheet receiving member, enables the sheet material to be held in a stable fashion.

BRIEF DESCRIPTION OF THE DRAWINGS

FIG. 13 is a perspective view of the conventional rubber member sticking device in the form of the cylindrical body, showing a state in which the unvulcanized rubber sheet is being separated.

MOST PREFERRED EMBODIMENTS FOR IMPLEMENTING THE INVENTION

A first embodiment of a rubber member sticking device according to the present invention will be described with reference to the drawings.

Figure 1:
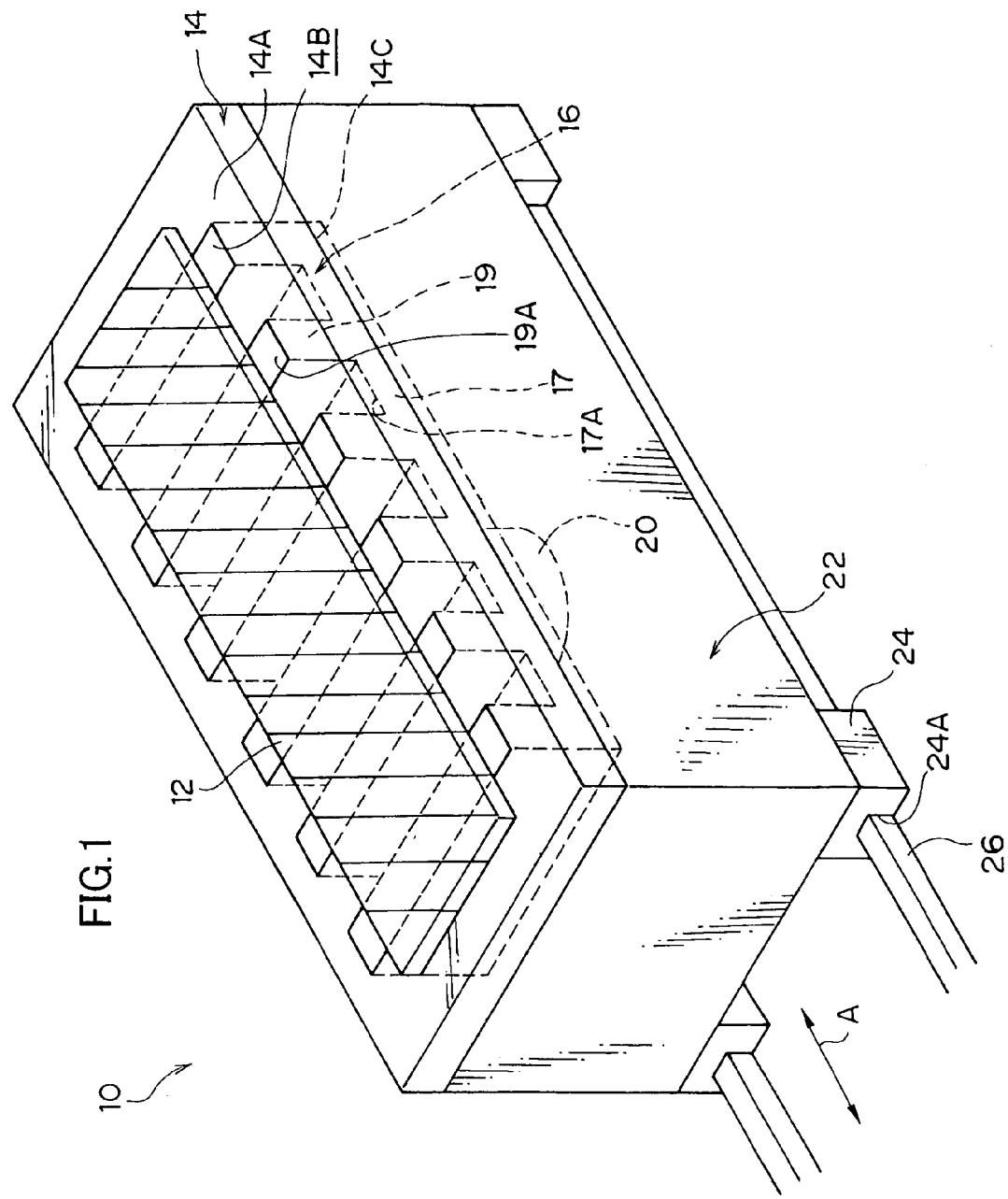
FIG. 1 is a perspective view of a rubber member sticking device according to a first embodiment of the present invention.

As shown in FIG. 1, a rubber member sticking device 10 handles an unvulcanized rubber sheet 12 serving as a viscous sheet material.

The unvulcanized rubber sheet 12 will now be outlined.

Figure 9:
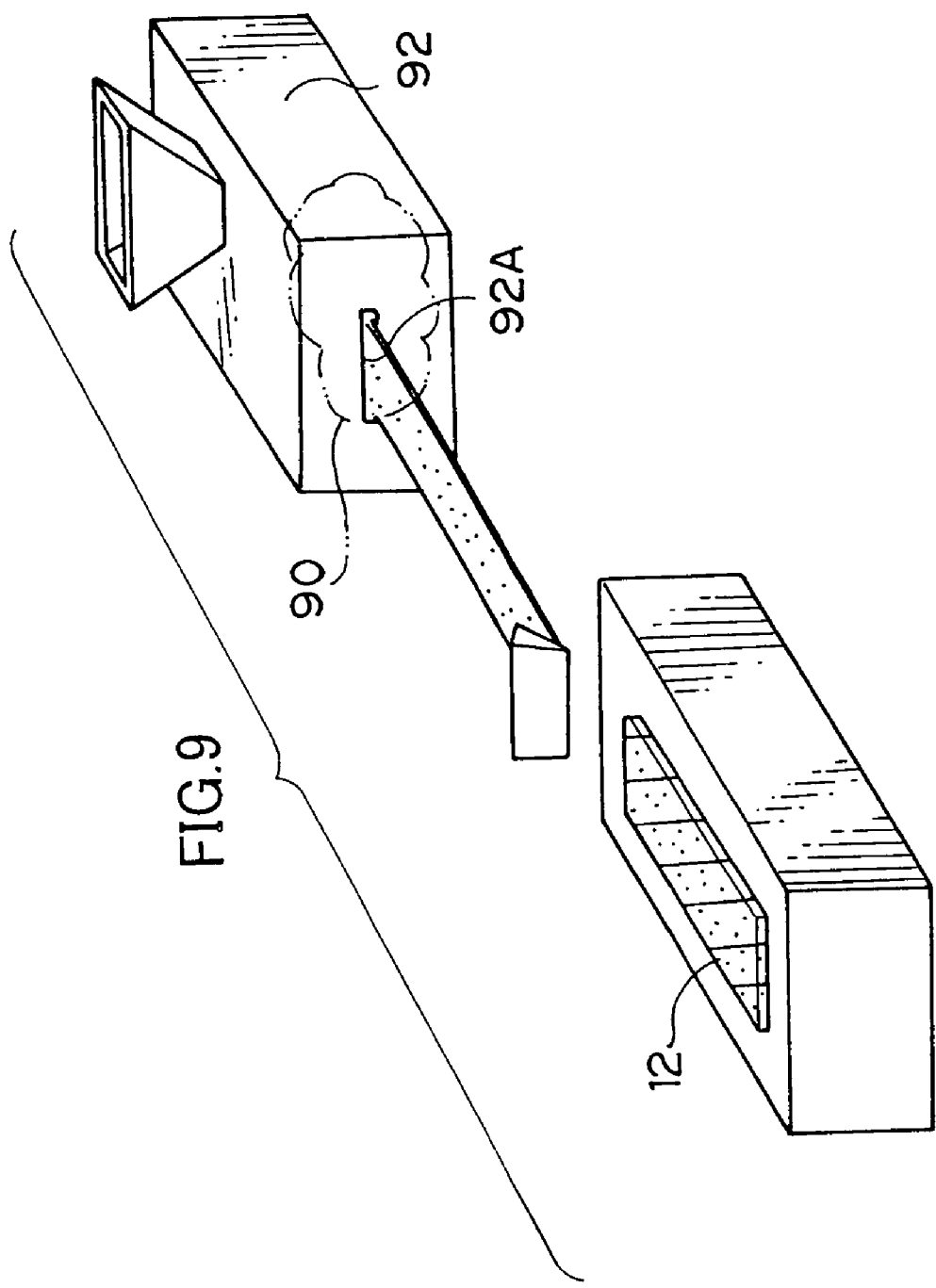
FIG. 9 is an explanatory view showing a process of producing the unvulcanized rubber sheet.
Figure 10:
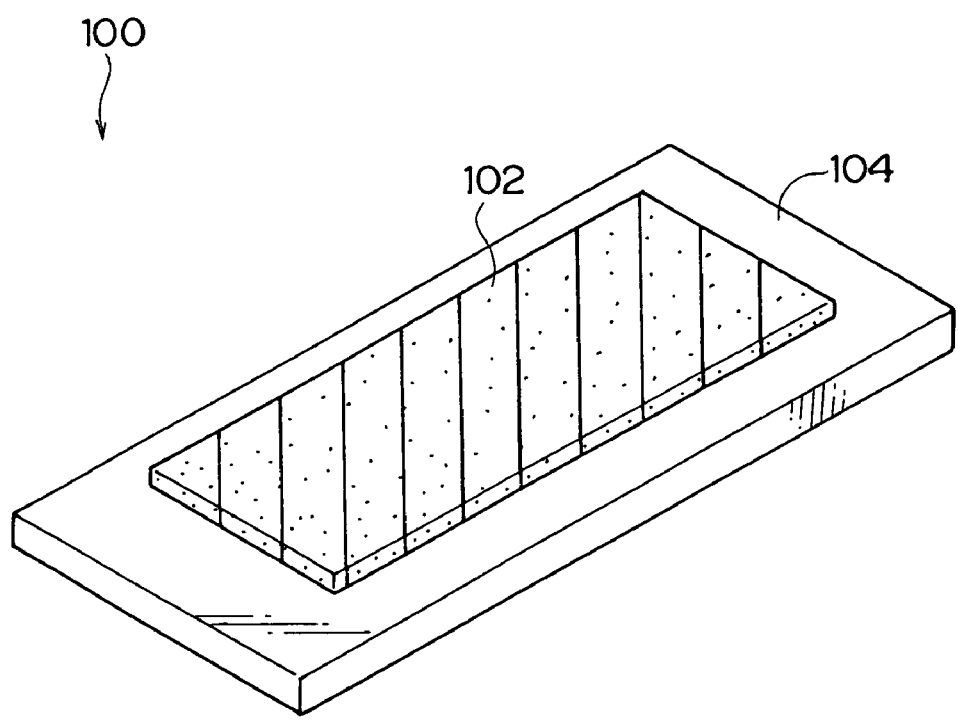
FIG. 10 is a perspective view of a conventional rubber member sticking device in the form of a flat plate.
Figure 11:
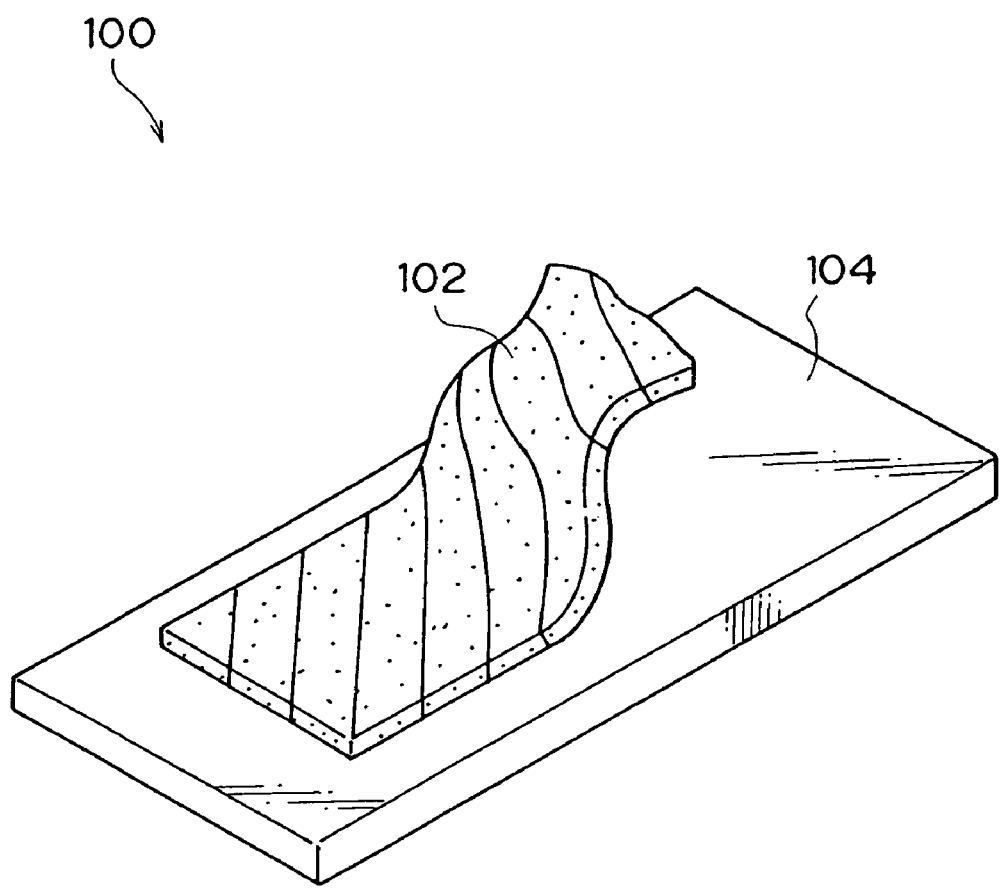
FIG. 11 is a perspective view of the conventional rubber member sticking device in the form of the flat plate, showing a state in which the unvulcanized rubber sheet is being separated.
Figure 12:
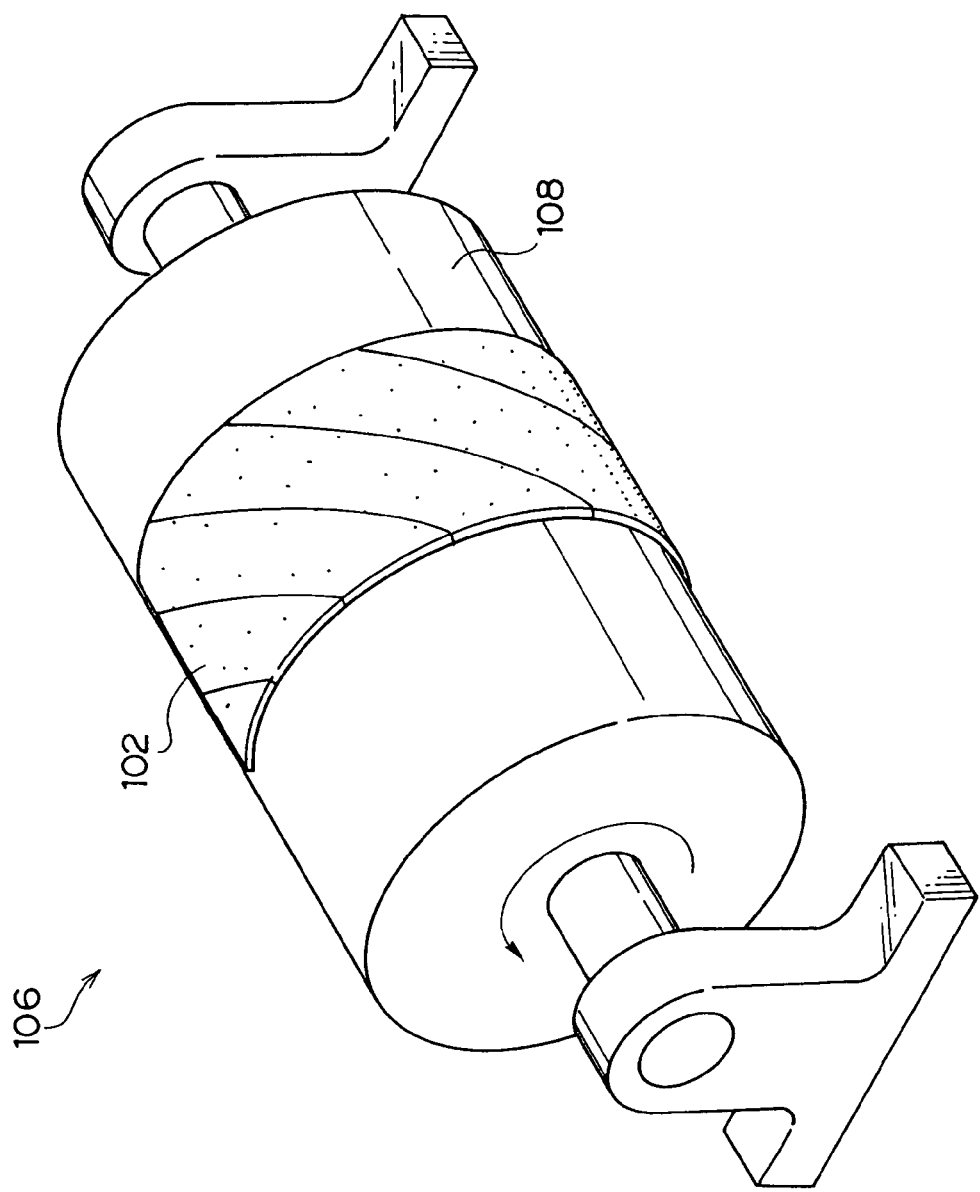
FIG. 12 is a perspective view of a conventional rubber member sticking device in the form of a cylindrical body.

As shown in FIG. 9, rubber 90 in an unvulcanized state, which is the raw material for the unvulcanized rubber sheet 12 (see FIG. 1), is softened by heat and supplied to an extruder 92. The extruder 92 extrudes the rubber 90 in the unvulcanized state from a mouthpiece 92A. The extruded rubber 90 in the unvulcanized state is cut into the unvulcanized rubber sheet 12. The unvulcanized rubber sheet 12 is held and transferred by the rubber member sticking device 10.

Figure 2:
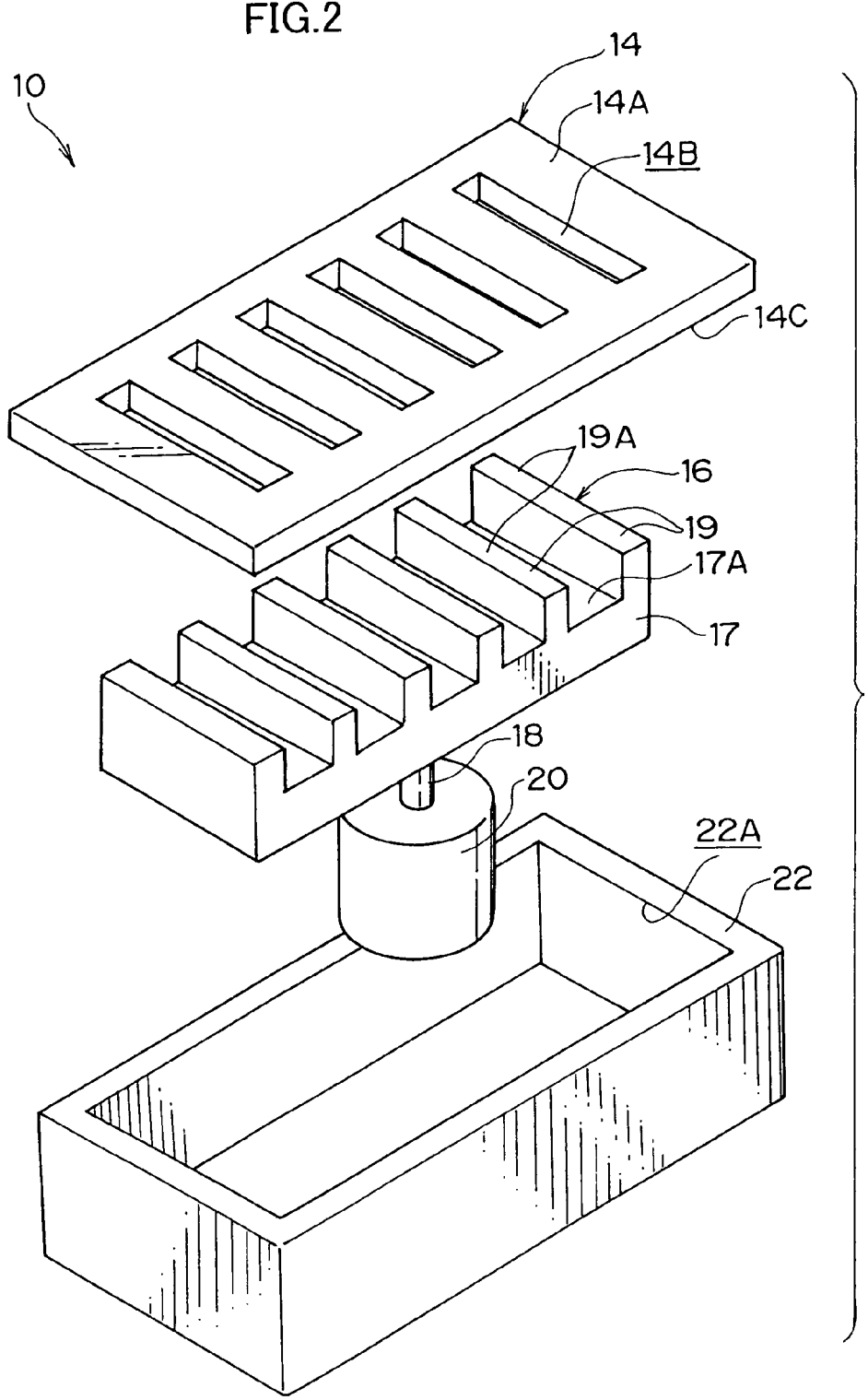
FIG. 2 is an exploded perspective view of the rubber member sticking device according to the first embodiment of the present invention.

As shown in FIGS. 1 and 2, the rubber member sticking device 10 includes a flat plate 14 serving as a first sheet receiving member, on which the unvulcanized rubber sheet 12 is disposed. The flat plate 14 may be made of a material capable of releasing from the unvulcanized rubber sheet 12 (e.g., Teflon®), or, alternatively, may be made of a material capable of adhering to the unvulcanized rubber sheet 12 (e.g., iron) and thereafter subjected to surface treatment (grain finish) so as to secure a release property. Since the unvulcanized rubber sheet 12 is supported by a separating surface 14A of the flat plate 14, the unvulcanized rubber sheet 12 can be separated by means of a modicum of force.

The flat plate 14 is provided with plural rectangular through-holes 14B, which extend from the separating surface 14A in a thickness direction of the flat plate 14, and which are arranged in parallel with each other. A lifting member 16 serving as a second sheet receiving member is disposed below the through-holes 14B. The lifting member 16 is composed of a rectangular base plate 17 and fitting blocks 19 provided at predetermined intervals so as to protrude from an upper surface 17A of the base plate 17 and fit into the through-holes 14B. The height of the fitting blocks 19 is determined such that, when the fitting blocks 19 fit into the through-holes 14B, and in consequence there is no difference in level between fitting surfaces 19A of the fitting blocks 19 and the separating surface 14A and a flat surface is thereby formed, the upper surface 17A of the base plate 17 abuts against a bottom surface 14C of the flat plate 14. A capability of adhering to the unvulcanized rubber sheet 12 may be imparted to the fitting surfaces 19A by using a material capable of adhering to the unvulcanized rubber sheet 12 (e.g., iron) to make the fitting blocks 19 themselves, or alternatively, by subjecting the fitting blocks 19 to surface treatment.

The base plate 17 is supported by a rod 18 of a hydraulic jack 20. When the rod 18 is lengthened or shortened, the lifting member 16 is raised or lowered.

The hydraulic jack 20 is contained in a casing 22. An opening 22A of the casing 22 is closed by the flat plate 14, and the lifting member 16 is accommodated inside the casing 22.

Further, guide blocks 24 are mounted on four corners of a bottom plate of the casing 22. Recessed portions 24A are respectively formed in lower surfaces of the guide blocks 24 to engage slidably with rails 26. This structure enables the casing 22 to move in the direction of Arrow A.

Next, the operation of the first embodiment will be described.

Figure 3:
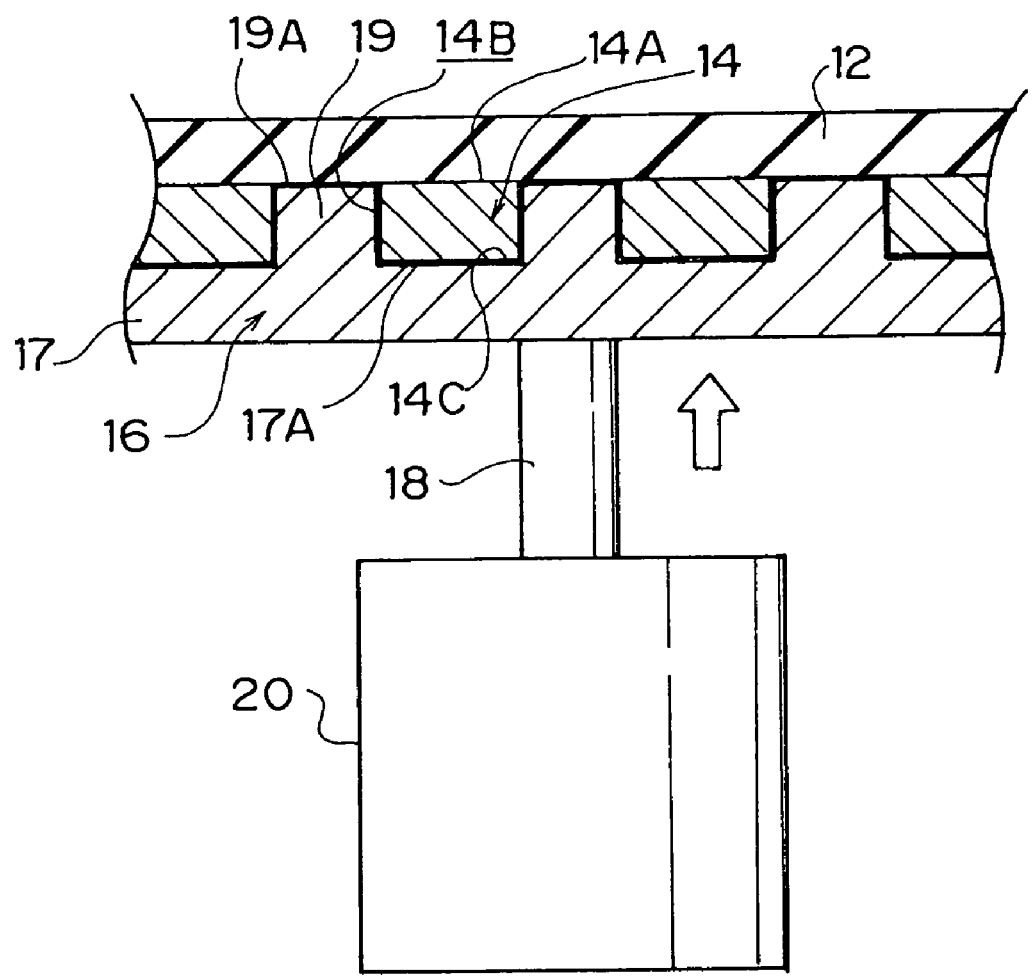
FIG. 3 is a cross-sectional view of the main portion of the rubber member sticking device according to the first embodiment of the present invention, showing a state in which an unvulcanized rubber sheet is supported by a separating surface and fitting surfaces.

As shown in FIG. 3, when the unvulcanized rubber sheet 12 is stuck, the unvulcanized rubber sheet 12 is supported by the separating surface 14A of the flat plate 14 and the fitting surfaces 19A of the lifting member 16 without a difference in level being created therebetween. In this state, the unvulcanized rubber sheet 12 is in close contact with the fitting surfaces 19A of the lifting member 16. Since the gravity of the unvulcanized rubber sheet 12 acts directly on the fitting surfaces 19A, the unvulcanized rubber sheet 12 can be reliably held even when the adhesive force on the fitting surfaces 19A of the lifting member 16 is relatively weak. Further, the plural fitting surfaces 19A, where the unvulcanized rubber sheet 12 and the lifting member 16 make contact with each other, enable the unvulcanized rubber sheet 12 to be held in a stable fashion.

Accordingly, even when the rubber member sticking device 10 (see FIG. 1) is moved in a vertical, longitudinal or widthwise direction, the unvulcanized rubber sheet 12 is neither removed nor dislocated.

Figure 4:
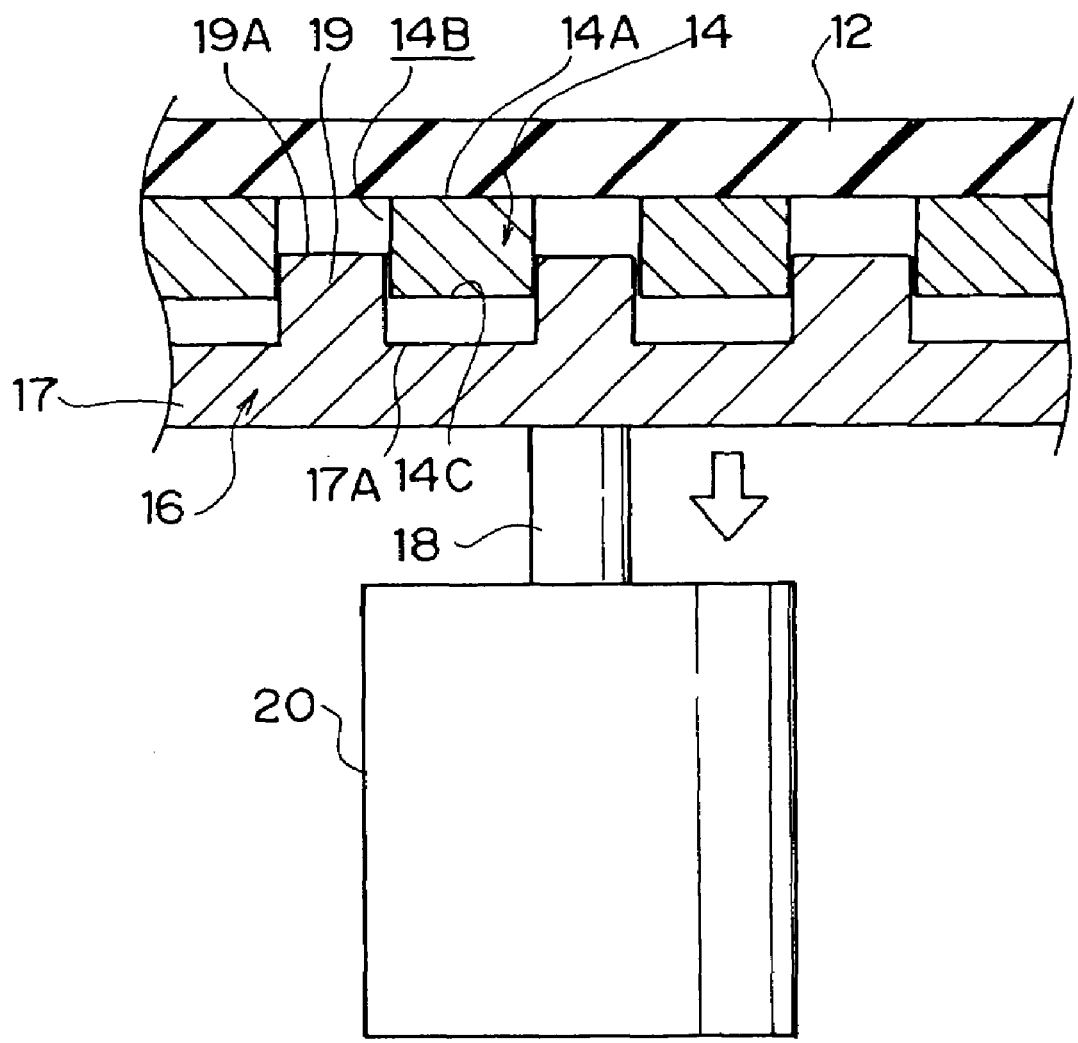
FIG. 4 is a cross-sectional view of the main portion of the rubber member sticking device according to the first embodiment of the present invention, showing a state in which the unvulcanized rubber sheet is supported only by the separating surface.
Figure 5:
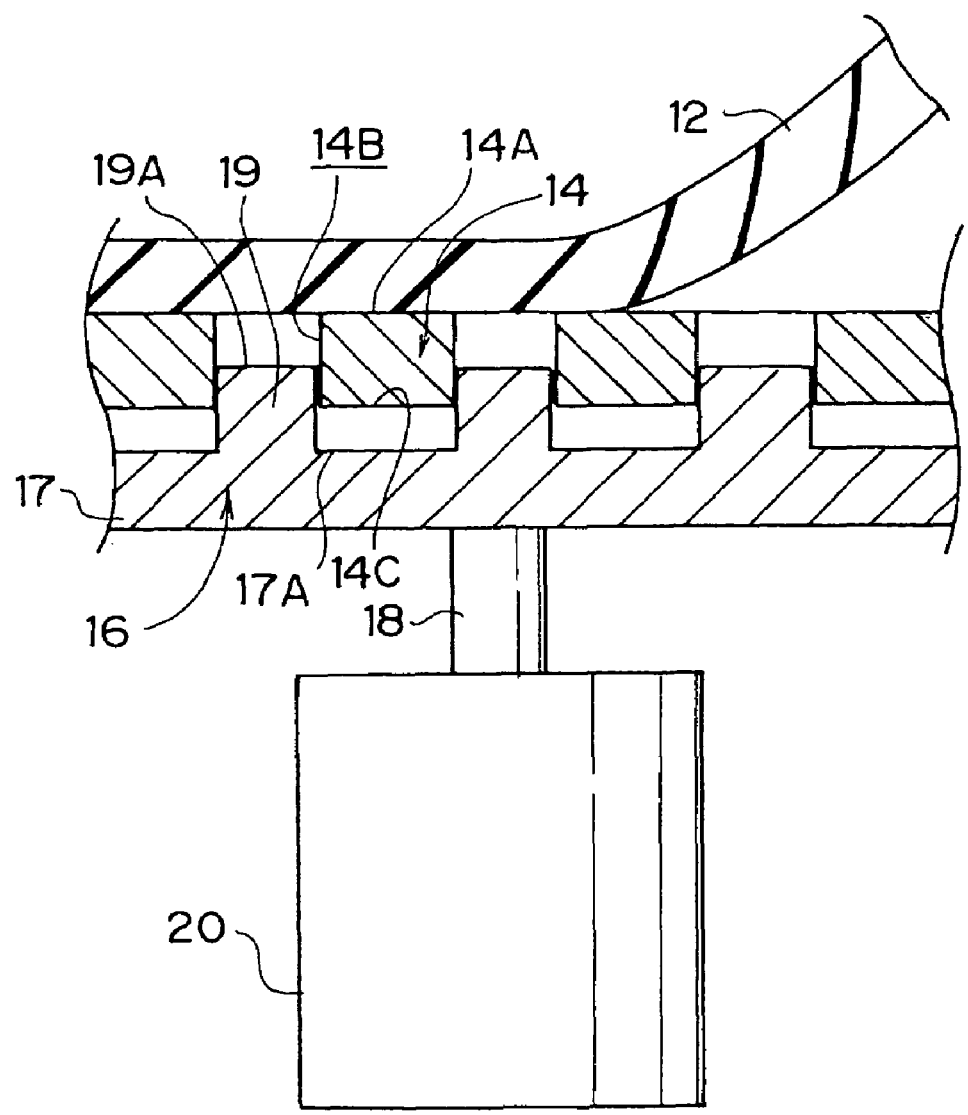
FIG. 5 is a cross-sectional view of the main portion of the rubber member sticking device according to the first embodiment of the present invention, showing a state in which the unvulcanized rubber sheet is being separated.

On the other hand, as shown in FIGS. 4 and 5, when the unvulcanized rubber sheet 12 is separated, the hydraulic jack 20 lowers the lifting member 16 to create a difference in level between the separating surface 14A of the flat plate 14 and the fitting surfaces 19A of the lifting member 16 so that the unvulcanized rubber sheet 12 is supported only by the separating surface 14A of the flat plate 14.

In this process, only portions of the sheet material 12 supported by the fitting surfaces 19A are released first in a state in which the remaining portions of the sheet material 12 continue to be supported by the separating surface 14A. Therefore, deformation and stretching of the unvulcanized rubber sheet 12 occur only at portions corresponding to the fitting surfaces 19A, and in this way wholesale deformation and stretching of the unvulcanized rubber sheet 12 can be suppressed. Since the fitting surfaces 19A are dispersed at plural portions, the adhesive force is also dispersed and only a relatively modest force needs to be applied to each of the fitting surfaces 19A, to separate it from the unvulcanized rubber sheet 12. Deformation and stretching of the unvulcanized rubber sheet 12 can accordingly be prevented with greater certitude.

Further, since the unvulcanized rubber sheet 12 is disposed on the flat surface, only a relatively small adhesive force is required for setting the unvulcanized rubber sheet 12 on the fitting surfaces 19A, and accordingly only a relatively small driving force is required when the unvulcanized rubber sheet 12 is separated from the fitting surfaces 19A. In consequence, the unvulcanized rubber sheet 12 can be held and transferred with a modicum of energy.

Furthermore, since the separating surface 14A has no adhesive property, when the unvulcanized rubber sheet 12 is separated from the separating surface 14A, the unvulcanized rubber sheet 12 can be transferred and transported with a modicum of force.

In the present invention, unlike in the prior art, it is not necessary for the unvulcanized rubber sheet 12 to be held by means of suction of a vacuum device, and traces of vacuum holes of the vacuum device can thus be eliminated.

Next, a second embodiment will be described.

Figure 6:
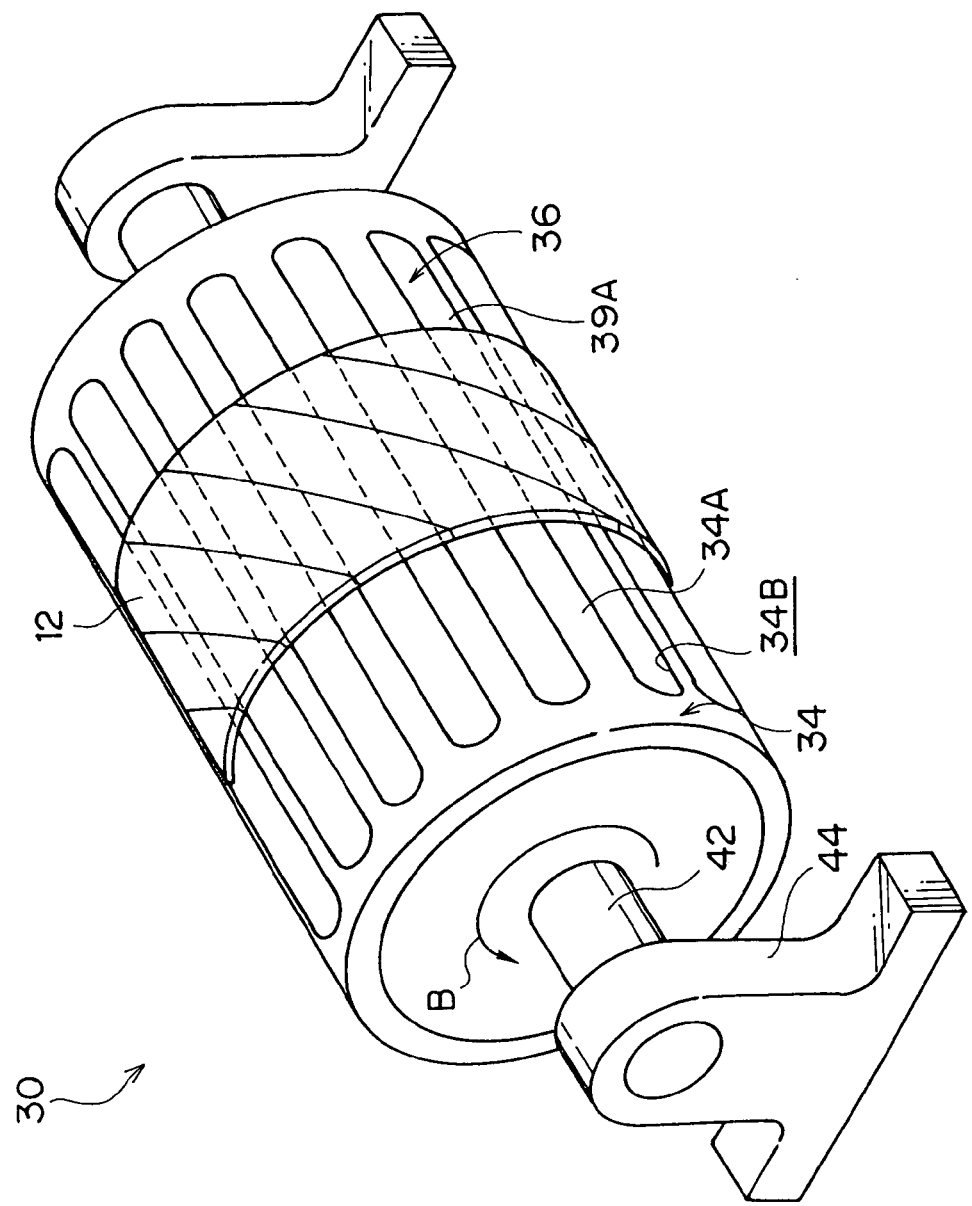
FIG. 6 is a perspective view of a rubber member sticking device according to a second embodiment of the present invention.
Figure 7:
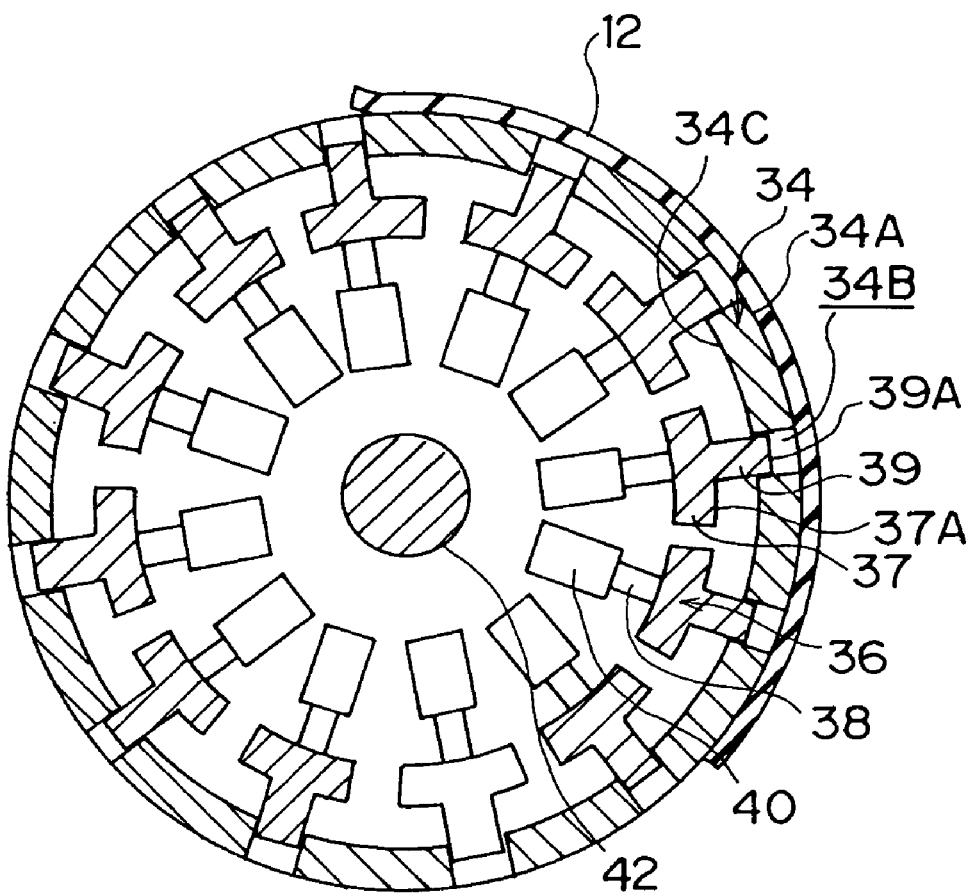
FIG. 7 is a cross-sectional view of the rubber member sticking device according to the second embodiment of the present invention.

In the second embodiment, as shown in FIGS. 6 and 7, a rubber member sticking device 30 includes a drum 34 serving as a first sheet receiving member, around which the unvulcanized rubber sheet 12 is wound. The drum 34 may be made of a material capable of releasing from the unvulcanized rubber sheet 12 (e.g., Teflon®), or, alternatively, may be made of a material capable of adhering to the unvulcanized rubber sheet 12 (e.g., iron) and thereafter subjected to surface treatment (grain finish) so as to secure a release property. Since the unvulcanized rubber sheet 12 is supported by a separating surface 34A of the drum 34, the unvulcanized rubber sheet 12 can be separated by means of a modicum of force.

The separating surface 34A is provided with plural substantially rectangular through-holes 34B arranged in parallel with each other. Corners of each through-hole 34B are rounded.

A lifting member 36 serving as a second sheet receiving member is disposed inside the drum 34. The lifting member 36 is composed of base plates 37 having circular-arc-shape in a sectional view and fitting blocks 39 provided so as to respectively protrude from the base plates 37 in a radially outer direction and fit into the through-holes 34B. The height of the fitting blocks 39 is determined such that, when the fitting blocks 39 fit into the through-holes 34B, and in consequence there is no difference in level between fitting surfaces 39A of the fitting blocks 39 and the separating surface 34A and a cylindrical surface is thereby formed, external surfaces 37A of the base plates 37 abut against an internal circumferential wall 34C of the drum 34. A capability of adhering to the unvulcanized rubber sheet 12 may be imparted to the fitting surfaces 39A by using a material capable of adhering to the unvulcanized rubber sheet 12 (e.g., iron) to make the fitting blocks 39 themselves, or alternatively, by subjecting the fitting blocks 39 to surface treatment.

The base plates 37 are respectively supported by rods 38 of hydraulic jacks 40, which are respectively fixed to a drum shaft 42 of the drum 34 by fixtures (not shown). When the rods 38 are lengthened or shortened, the lifting member 36 is expanded or contracted.

The drum shaft 42 is rotatably supported by shaft supporting members 44. This structure enables the drum 34 to rotate in the direction of Arrow B.

Next, the operation of the second embodiment will be described.

As shown in FIG. 6, when the unvulcanized rubber sheet 12 is stuck, the unvulcanized rubber sheet 12 is supported by the separating surface 34A of the drum 34 and the fitting surfaces 39A of the lifting member 36 without a difference in level being created therebetween. In this state, the unvulcanized rubber sheet 12 is in close contact with the fitting surfaces 39A of the lifting member 36. Further, the plural fitting surfaces 39A, where the unvulcanized rubber sheet 12 and the lifting member 36 make contact with each other, enable the unvulcanized rubber sheet 12 to be held in a stable fashion.

Accordingly, even when the rubber member sticking device 30 is moved in a vertical, longitudinal or widthwise direction, or the drum 34 is rotated in the direction of Arrow B, the unvulcanized rubber sheet 12 is neither removed nor dislocated.

On the other hand, as shown in FIG. 7, when the unvulcanized rubber sheet 12 is separated, the hydraulic jacks 40 pull the lifting member 36 inside to create a difference in level between the separating surface 34A of the drum 34 and the fitting surfaces 39A of the lifting member 36 so that the unvulcanized rubber sheet 12 is supported only by the separating surface 34A of the drum 34.

In this process, only portions of the unvulcanized rubber sheet 12 supported by the fitting surfaces 39A are released first in a state in which the remaining portions of the unvulcanized rubber sheet 12 continue to be supported by the separating surface 34A. Therefore, deformation and stretching of the unvulcanized rubber sheet 12 occur only at portions corresponding to the fitting surfaces 39A, and in this way wholesale deformation and stretching of the unvulcanized rubber sheet 12 can be suppressed. Since the fitting surfaces 39A are dispersed at plural portions, the adhesive force is also dispersed and only a relatively modest force needs to be applied to each of the fitting surfaces 39A in order to separate it from the unvulcanized rubber sheet 12. Deformation and stretching of the unvulcanized rubber sheet 12 can accordingly be prevented with greater certitude.

Further, since the separating surface 34A has no adhesive property, when the unvulcanized rubber sheet 12 is separated from the separating surface 34A, the unvulcanized rubber sheet 12 can be transferred and transported with a modicum of force.

Furthermore, a combination of the rotating movement and the separation operation enables the unvulcanized rubber sheet 12 to be transferred easily.

Next, a third embodiment will be described.

Figure 8:
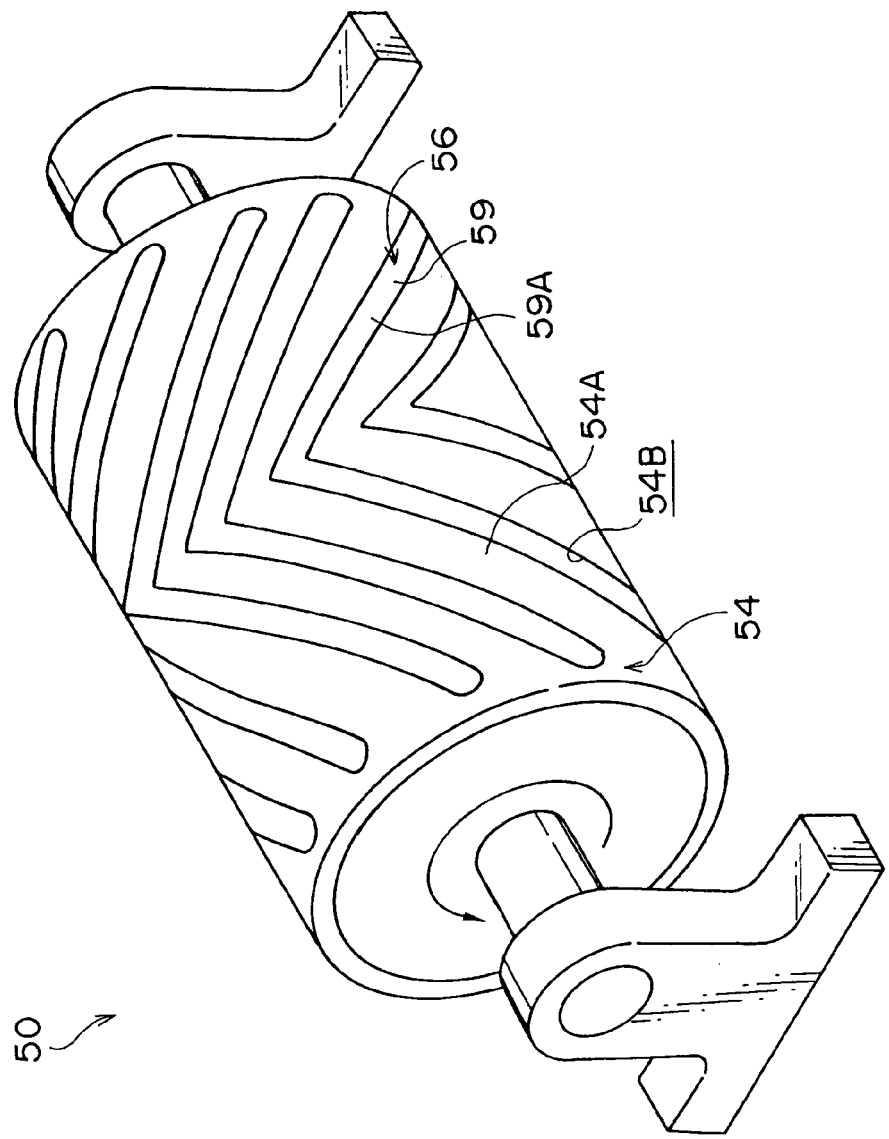
FIG. 8 is a perspective view of a rubber member sticking device according to a third embodiment of the present invention.

Although the third embodiment is basically identical to the second embodiment, the third embodiment differs from the second embodiment insofar that a separating surface 54A of a rubber member sticking device 50 is provided with plural substantially V-shaped through-holes 54B in a plan view, through-holes 54B being arranged in parallel with each other, as shown in FIG. 8.

A lifting member 56 serving as a second sheet receiving member is disposed inside a drum 54. The lifting member 56 includes substantially V-shaped fitting blocks 59 in a plan view, fitting blocks 59 being capable of fitting into/retracting from the through-holes 54B. External surfaces of the fitting blocks 59 are formed as substantially V-shaped fitting surfaces 59A.

In this structure, since the fitting surfaces 59A are respectively formed in a substantially V-shape and the fitting surfaces 59A make close contact with the unvulcanized rubber sheet 12 (not shown) at a certain angle to the widthwise direction of the unvulcanized rubber sheet 12, the unvulcanized rubber sheet 12 is easily separated from the fitting surfaces 59A.

In the above-described embodiments, in order to separate the unvulcanized rubber sheet, the fitting surfaces are pulled inside. However, the present invention is not limited to this method, and in sharp contrast the separating surface may be pushed outside.

Further, in the embodiments described above, hydraulic jacks are used by way of example as a driving means. However, air or electricity may also be used as a driving source, and a driving means is not limited to hydraulic jacks.

Furthermore, in the embodiments described above, an unvulcanized rubber sheet is used by way of example as a viscous sheet. However, the present invention is not limited to an unvulcanized rubber sheet, and a plastic sheet, for example, may also be used.

INDUSTRIAL APPLICABILITY

As described above, the rubber member sticking device according to the present invention is preferably used for holding and transferring a rubber sheet material, for example, in a case in which it is desired to prevent the rubber sheet material from becoming deformed and stretching during a separation operation, suppress loss of energy and eliminate traces of vacuum holes. An unvulcanized rubber sheet material for tires is preferably used as the rubber sheet material.

The invention claimed is:

1. A method of holding and transferring to prevent an unvulcanized rubber sheet from being deformed, comprising:
   providing a rubber member device for holding and transferring, comprising a first sheet receiving member including a separating surface capable of releasing from an unvulcanized rubber sheet, and a second sheet receiving member including fitting surfaces capable of adhering to the unvulcanized rubber sheet;
   placing the unvulcanized rubber sheet on the separating surface and the fitting surfaces without a difference in level being created there-between;
   adhering the fitting surfaces of the second sheet receiving member to the unvulcanized rubber sheet while not adhering the separating surface of the first sheet receiving member to the unvulcanized rubber sheet when the unvulcanized rubber sheet is supported by the separating surface and the fitting surfaces without a difference in level being created there-between; and retracting the second sheet receiving member so that the unvulcanized rubber sheet is supported only by the separating surface with a difference in level being created between the separating surface and the fitting surfaces.

2. The method of claim 1, wherein:

the separating surface of the first sheet receiving member is provided with a plurality of through-holes extending in a thickness direction of the first sheet receiving member, and the second sheet receiving member is provided so as to fit into/retract from the through-holes; and the retracting the second sheet receiving member comprises retracting the second sheet receiving member from the plurality of through-holes of the first sheet receiving member.

3. The method of claim 1, wherein, when the second sheet receiving member is retracted, the fitting surfaces withdraw from the level created by the fitting surfaces and the separating surface when the unvulcanized rubber sheet is adhered to the fitting surfaces.

* * * * *